April 12, 1966 W. H. JOHNSON 3,245,540
SAND FILTER DISTRIBUTOR NOZZLE
Filed Aug. 5, 1964
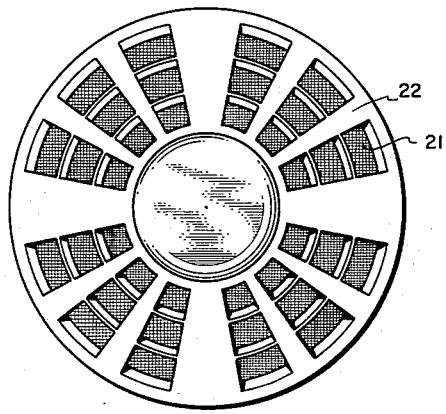
FIG. 2
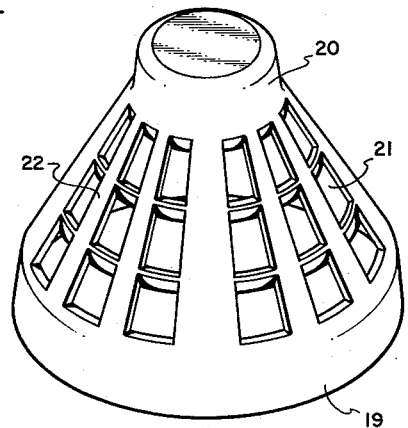
FIG. 3
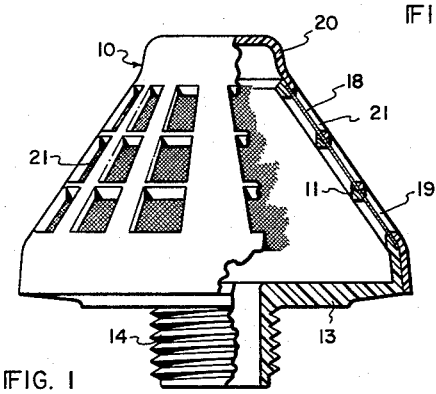
FIG. 1
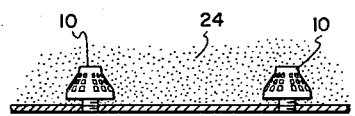
FIG. 4
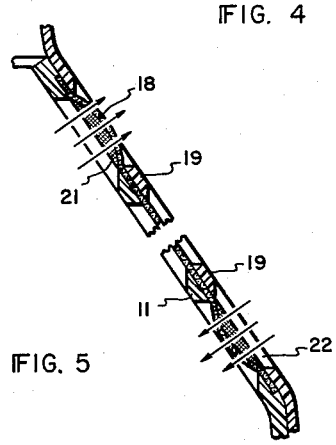
FIG. 5
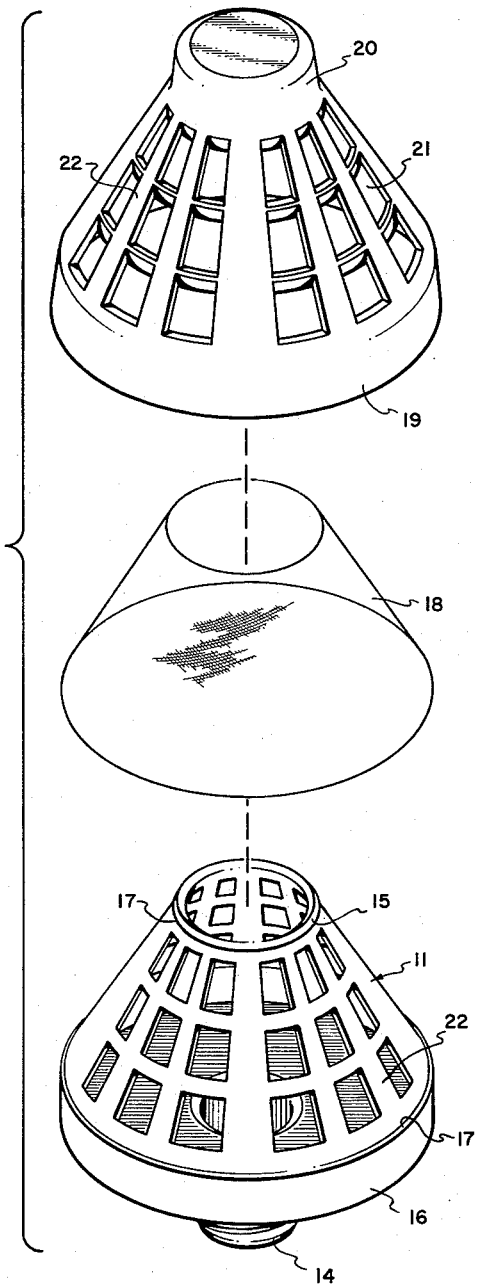
INVENTOR.
WILLIAM H. JOHNSON
BY Robert W. Hohef
ATTORNEY United States Patent Office 3,245,540
Patented Apr. 12, 1966

3,245,540
SAND FILTER DISTRIBUTOR NOZZLE
William H. Johnson, Mountain View, Calif., assignor to The Eimco Corporation, Salt Lake City, Utah, a corporation of Delaware
Filed Aug. 5, 1964, Ser. No. 387,663
7 Claims. (Cl. 210—291)

This invention relates generally to gravity filtering apparatus of the type in which a sand bed supported on a false bottom is used as the filtering media and more particularly to an improved nozzle means for mounting on the false bottom under the sand bed facilitating discharge of liquid while blocking sand outflow during filtering and for diffusing and distributing liquid into the sand bed when the flow is reversed during backwashing.

With known nozzle construction for use in gravity filters it has been found necessary to use an initial bed of coarse gravel under the sand filtering media to surround the nozzles and thereby prevent the orifices therein from becoming clogged with fine sand and to prevent sand from entering the underdrain area. Even with this provision sand will still become lodged in the orifices and under such circumstances it is difficult if not impossible to remove during backwashing of the filter media, requiring shut down of the entire apparatus and manual cleaning of each nozzle.

Accordingly, it is an object of this invention to provide a nozzle of the type described not having the aforementioned disadvantages.

Another object of this invention is to provide a nozzle for use in a sand bed filter which is self-cleaning such that the orifices therein will remain free of sand accumulations.

Still another object is to provide a nozzle which will distribute liquid evenly into the sand bed during backwashing.

A further object is to provide a nozzle construction which is strong enough to withstand high pressures caused by the weight of the overlying sand and liquid yet is simple and inexpensive.

Briefly, the invention comprises a nozzle composed of three parts, a hollow frusto-conical base member having a plurality of apertures or ports in its conical sidewall and a flat bottom wall from which depends a hollow mounting stem, an intermediate frusto-conical screen sleeve fitted over the conical portion of said base member, and an outer generally frusto-conical cover closed at the top provided with a plurality of symmetrically spaced apertures in its conical wall corresponding to and in alignment with those of the inner member, said cover adapted to fit over said base member and screen sleeve to engage the base member at its bottom and upper sections.

The base member and cover are preferably formed from a rigid synthetic plastic material and may be secured together by frictional engagement and, if necessary, sealed with heat or simply glued. The screen should be made of a relatively flexible and resilient material such as nylon or other synthetic polymer to facilitate sand removal as will be more fully explained hereinafter.

In order that the invention may be more readily understood and carried into effect, reference is made to the accompanying drawings which are offered by way of example and not in limitation of the invention, the scope of which is defined by the appended claims rather than any description preceding them.

FIG. 1 is a partially cutaway side elevational view of one embodiment of the invention.

FIG. 2 is a top view of the nozzle of FIG. 1.

FIG. 3 is an exploded view of the nozzle of FIG. 1 illustrating the three components thereof in greater detail.

FIG. 4 is a partial side view illustrating the nozzles mounted on the supporting plate for a sand filter bed.

FIG. 5 is a partial sectional view through the apertures of the nozzle showing flexing of the screen during the filtering and backwashing operations.

In the drawings the nozzle, generally designated 10, comprises a hollow structure formed with a single-piece inner or base member 11 of generally frusto-conical shape open at the top and having a bottom wall 13 from which depends a threaded hollow stem 14. Both the upper and lower wall portions 15 and 16 of the base member are thicker than the major portion of the side wall and are formed with free edges or shoulders 17 between which is defined a space for receiving and accommodating a frusto-conical shaped screen 18 of suitable flexible material. This screen is sandwiched between the conical walls of the base member 11 and a frusto-conical cover piece 19 which is open at the bottom and has a closed cylindrical top portion 20 but is otherwise generally co-extensive in size and shape with the base member.

The conical wall portions of both the base member and the cover piece are provided with a plurality of symmetrically spaced and aligned apertures 21 to accommodate high volume liquid flow. The solid upper and lower wall portions 15 and 16 of the base member and corresponding inner wall portions of the cover piece fit snugly and provide a relatively high surface area for securing the parts together and firmly holding the screen in position. If necessary, the parts may be further sealed by resinous materials or by heat when molded from plastics.

It will be observed that the top portion 20 of the cover is generally cylindrical and that the conical wall portions of both the cover and base member comprise a series of vertical and horizontal ribs 22 formed by the trapezoidal apertures therein. This construction is important since it enables the nozzle to withstand the crushing pressure of sand and liquid, while still providing a large open area for transmitting a high volume of liquid. If added strength is required, several of the vertical ribs may be widened in symmetrical relationship around the wall as illustrated.

With this arrangement it can be seen that the assembled nozzle provides a structure which is extremely strong yet allows for maximum flow area. When used during upflow conditions, liquid is emitted in all directions effecting a distribution which is of value in many operations such as backwashing a sand bed.

In FIG. 4 the nozzles are shown mounted on a bottom support wall 23 for a sand filter bed 24. During the filtering cycle liquid flows downwardly through the bed, enters the nozzle and is discharged out the hollow stem. Due to the particular sandwiched nozzle structure and because the screen is flexible, sand is prevented from accumulating over the apertures. Thus, in the lower part of FIG. 3 the screen is shown bowed inwardly by the flow of liquid during filtering as represented by the arrows. The flow is periodically reversed whenever the sand bed becomes loaded with impurities and during such backwashing the screen bows outwardly as liquid passes upwardly and out the apertures as indicated by the arrows in the upper part of FIG. 3. This flexing is important because it provides the self-cleaning feature of the nozzle. During downflow sand particles are trapped against the concave side of the screen and are removed as the screen is flexed outwardly by the reverse flow of liquid during backwash. If the screen were not self-cleaning the use of a nozzle of this type in a sand bed would not be possible because the screen would soon plug and effectively block liquid flow.

From the foregoing it will be evident that the present invention provides a nozzle structure that is simple and inexpensive yet strong enough to withstand the extreme pressures incident to sand bed filtering apparatus and because of its self-cleaning feature virtually eliminates periodic shutdown of the filtering operation hitherto necessary whenever the nozzle apertures become clogged.

I claim:

1. A nozzle for use in sand bed filtering apparatus comprising a hollow inner body having a wall portion and closed bottom portion, a discharge outlet in said bottom portion, a cover generally co-extensive in area and shape with said inner member, a plurality of identical symmetrically spaced aligned apertures in the wall portions of said inner body and cover, a flexible screen between the wall portions of said inner body and cover and means securing said inner body to said cover.

2. A nozzle for use in sand bed filtering apparatus comprising a hollow frusto-conical walled inner body having a closed bottom, a discharge outlet in said bottom, a cover generally co-extensive in area and shape with said inner body, a plurality of identical symmetrically spaced aligned apertures in the conical wall portions of said inner body and cover, a flexible screen sleeve between the conical walls of said inner body and cover, and means securing said inner body to said cover.

3. A nozzle for use in sand bed filtering apparatus comprising a hollow frusto-conical inner body closed at the bottom, discharge outlet in said bottom, mounting means in said bottom, a frusto-conical screen sleeve positioned over the conical wall portion of said inner body, a frusto-conical cover co-extensive in area with said inner body positioned over said screen, a plurality of symmetrically spaced aligned apertures in the conical wall portions of said inner body and cover, said apertures forming vertical and horizontal ribs in the conical wall portions of said inner body and cover, and means securing said cover to said inner body.

4. A nozzle for use in sand bed filtering apparatus comprising a hollow frusto-conical inner body closed at the bottom, a discharge outlet in said bottom, mounting means in said bottom, a flexible frusto-conical screen sleeve, means in the conical wall of said inner body for receiving said screen, a cover over said inner body and screen having a frusto-conical wall portion co-extensive in area with the conical wall portion of said inner body and having a closed cylindrical top portion, a plurality of symmetrically spaced aligned apertures in the conical wall portions of said inner body and cover, said apertures forming straight vertical and horizontal ribs in the walls thereof, said vertical ribs of gradually increasing width toward the bottom, and means securing said cover to said inner body.

5. The nozzle of claim 4 in which said apertures are trapezoidal in shape.

6. The nozzle of claim 4 in which a plurality of said vertical ribs are at least twice as wide as the remaining vertical ribs and are spaced symmetrically around the cover and inner body.

7. The nozzle of claim 4 in which said discharge outlet and mounting means comprise a threaded hollow neck depending from said bottom.

References Cited by the Examiner

UNITED STATES PATENTS

| 401,057 | 4/1889 | Perkins | 210—292 |
| 667,005 | 1/1901 | Davis | 210—293 |

FOREIGN PATENTS 696,980 10/1940 Germany.

SAMIH N. ZAHARNA, *Primary Examiner.*